United States Patent
Yan et al.

(10) Patent No.: US 11,443,143 B2
(45) Date of Patent: Sep. 13, 2022

(54) UNATTENDED OBJECT DETECTION USING MACHINE LEARNING

(71) Applicant: International Business Machines Corporation, Armonk, NY (US)

(72) Inventors: Rong Yan, Beijing (CN); Shi Lei Zhang, Beijing (CN); Junsong Wang, Beijing (CN); Ke Wei Sun, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 188 days.

(21) Appl. No.: 16/931,098

(22) Filed: Jul. 16, 2020

(65) Prior Publication Data

US 2022/0019854 A1      Jan. 20, 2022

(51) Int. Cl.
*G06V 10/22* (2022.01)
*G06K 9/62* (2022.01)
*G06N 3/08* (2006.01)
*G06V 10/44* (2022.01)

(52) U.S. Cl.
CPC .............. *G06K 9/6257* (2013.01); *G06N 3/08* (2013.01); *G06V 10/22* (2022.01); *G06V 10/44* (2022.01)

(58) Field of Classification Search
CPC .......... G06N 3/08; G06V 10/26; G06V 10/22; G06V 20/52; G06V 10/82
See application file for complete search history.

(56) References Cited

U.S. PATENT DOCUMENTS

| | | | |
|---|---|---|---|
| 10,212,397 B2 | 2/2019 | Zhang | |
| 10,296,601 B2 | 5/2019 | Botea et al. | |
| 10,417,781 B1* | 9/2019 | Konolige | G06N 3/08 |
| 2009/0238462 A1 | 9/2009 | Feris et al. | |
| 2019/0001929 A1 | 1/2019 | Mouleyre et al. | |
| 2019/0042844 A1* | 2/2019 | Paradiso | H04N 7/185 |
| 2019/0057611 A1* | 2/2019 | Kneuper | G08G 5/0091 |
| 2019/0251397 A1* | 8/2019 | Tremblay | G06N 3/08 |
| 2020/0012917 A1* | 1/2020 | Pham | G06F 16/9038 |
| 2020/0125575 A1* | 4/2020 | Ghoshal | G06F 3/0484 |
| 2021/0279603 A1* | 9/2021 | Teran Matus | G06N 5/04 |
| 2021/0289171 A1* | 9/2021 | Sarkar | H04N 7/183 |

(Continued)

OTHER PUBLICATIONS

Unattended Baggage Detection Using Deep Neural Networks | Intel Software | Published May 8, 2018 | Accessed Mar. 24, 2020 | https://software.intel.com/en-us/articles/unattended-baggage-detection-using-deep-neural-networks-in-intel-architecture.

(Continued)

*Primary Examiner* — Sam Bhattacharya
(74) *Attorney, Agent, or Firm* — Patterson + Sheridan, LLP (57) ABSTRACT

Techniques for unattended object detection using machine learning are disclosed. A machine learning policy, for use in identifying unattended objects in a captured image depicting one or more objects, is generated. The generating includes determining a level of occlusion in the captured image relating to the objects, and determining the machine learning policy based on the determined level of occlusion. A machine learning model is selected, from among a plurality of pre-defined machine learning models, based on the generated machine learning policy. An unattended object is detected in the captured image using the selected machine learning model.

18 Claims, 7 Drawing Sheets

(56) References Cited

U.S. PATENT DOCUMENTS

2021/0303885 A1* 9/2021 Hassan ............... G06K 9/6256

OTHER PUBLICATIONS

Sorina Smeureanu and Radu Tudor Ionescu, "Real-Time Deep Learning Method for Abandoned Luggage Detection in Video," arXiv:1803.01160v3 [cs.CV] Jun. 15, 2018.
Contractor et al., "CNNs for Surveillance Footage Scene Classification CS 231n Project," Stanford Universirty, 2017.
N. T. Pham, K. Leman, J. Zhang and I. Pek, "Two-stage unattended object detection method with proposals," 2017 IEEE 2nd International Conference on Signal and Image Processing (ICSIP), Singapore, 2017, pp. 1-4. [Abstract Only].
Sergey Zagoruyko and Nikos Komodakis, "Learning to Compare Image Patches via Convolutional Neural Networks," arXiv:1504.03641v1 [cs.CV] Apr. 14, 2015.
Huanglianghua/mot-papers | GitHub | Accessed Mar. 24, 2020 | https://github.com/huanglianghua/mot-papers/blob/master/README.md.
GitHub | Publication Date Feb. 24, 2020 | SpyderXu/multi-object-tracking-paper-list | Accessed Mar. 2020.
Tian, et al., (2008). Real-Time Detection of Abandoned and Removed Objects in Complex Environments.

* cited by examiner

UNATTENDED OBJECT DETECTION USING MACHINE LEARNING

BACKGROUND

The present invention relates to machine learning, and more specifically, in one or more embodiments, to unattended object detection using machine learning.

SUMMARY

Embodiments include a computer-implemented method. The method includes generating a machine learning policy for use in identifying unattended objects in a captured image depicting one or more objects, including determining a level of occlusion in the captured image relating to the objects and determining the machine learning policy based on the determined level of occlusion. The method further includes selecting a machine learning model, from among a plurality of pre-defined machine learning models, based on the generated machine learning policy. The method further includes identifying an unattended object in the captured image using the selected machine learning model.

Embodiments further include a system, including a processor and a memory storing a program, which, when executed on the processor, performs an operation. The operation includes generating a machine learning policy for use in identifying unattended objects in a captured image depicting one or more objects, including determining a level of occlusion in the captured image relating to the objects and determining the machine learning policy based on the determined level of occlusion. The operation further includes selecting a machine learning model, from among a plurality of pre-defined machine learning models, based on the generated machine learning policy. The operation further includes identifying an unattended object in the captured image using the selected machine learning model.

Embodiments further include a non-transitory computer program product, the computer program product including a computer-readable storage medium having computer-readable program code embodied therewith, the computer-readable program code executable by one or more computer processors to perform an operation. The operation includes generating a machine learning policy for use in identifying unattended objects in a captured image depicting one or more objects, including determining a level of occlusion in the captured image relating to the objects and determining the machine learning policy based on the determined level of occlusion. The operation further includes selecting a machine learning model, from among a plurality of pre-defined machine learning models, based on the generated machine learning policy. The operation further includes identifying an unattended object in the captured image using the selected machine learning model.

DETAILED DESCRIPTION

Automated detection of unattended object in an environment, based on images and video of the environment, can be a challenging problem. An unattended object can be, for example, an object that cannot be confidently assigned as belonging to a person for a threshold of time. This is especially true for crowded environments, in which objects are frequently occluded from view and many objects are present. One or more techniques disclosed herein can be used select appropriate machine learning policies for automated detection of unattended objects in a crowded environment.

For example, deep learning techniques can be very powerful and highly accurate in identifying unattended objects, but are typically computationally expensive and require more time to run. In crowded physical environments with relatively small objects, deep learning techniques may be necessary to identify unattended objects. In less crowded environments, however, or environments with relatively larger objects, simple feature analysis techniques may be sufficient. This can allow the use of less computationally expensive, and faster, techniques where appropriate. One or more techniques described herein relate to a feature matrix policy selector that can be used to identify machine learning policies (e.g., deep learning or simple feature analysis) for use in identifying unattended objects from captured images or videos of a physical environment.

Figure 1:
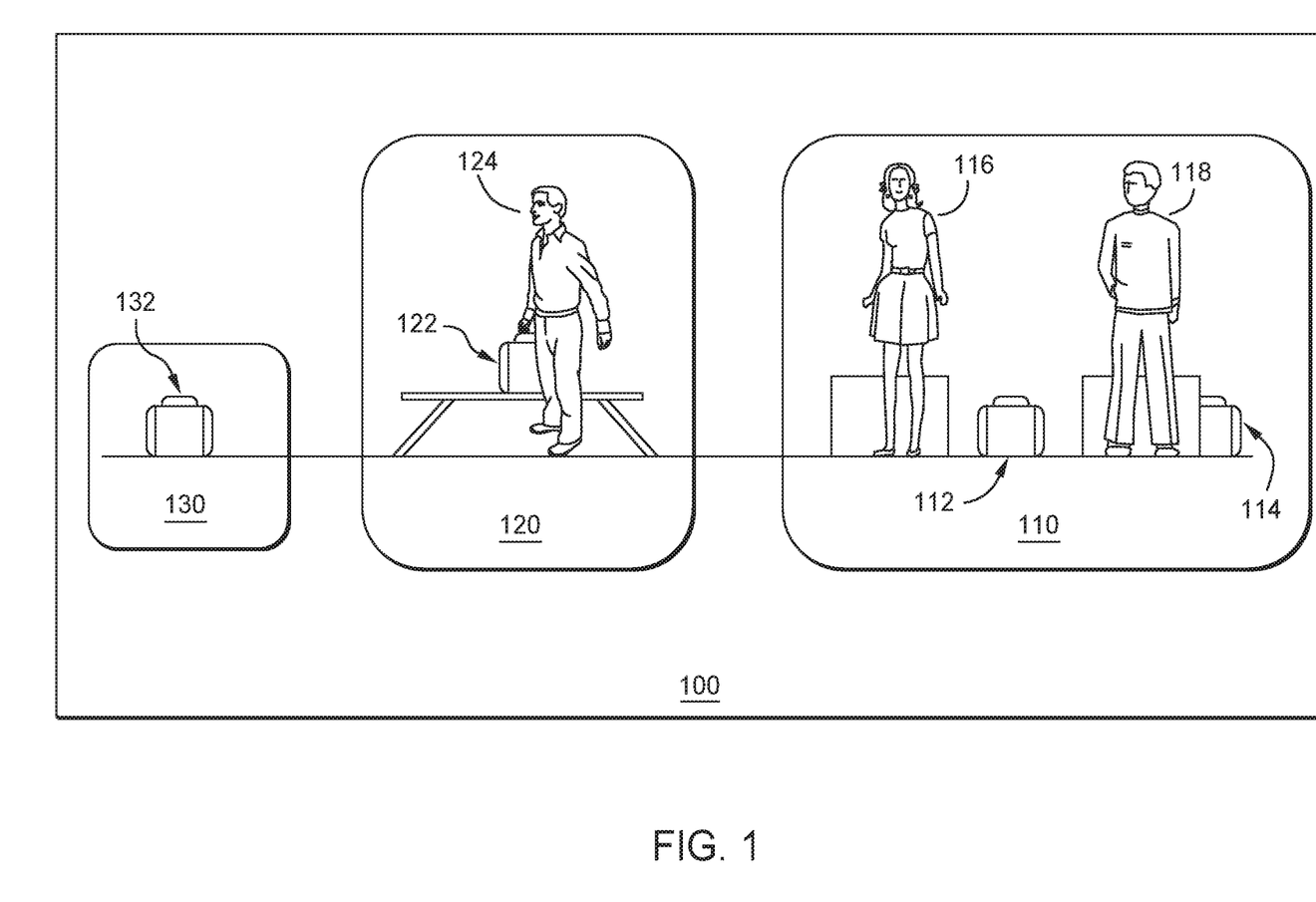
FIG. 1 illustrates objects for detection in a crowded environment, according to at least one embodiment.

FIG. 1 illustrates objects for detection in a crowded environment, according to at least one embodiment. A physical environment 100 includes two people, 116 and 118, and two objects 112 and 114 (e.g., suitcases, packages, backpacks, etc.). In an embodiment, an image capture device (e.g., a camera) uses a frame 110 to capture images of the objects 112 and 114. The object 114 is occluded from view in the frame 110, because it is partially blocked by the person 118. The object 112 is not occluded from view. Both the objects 112 and 114 are resting on the ground. Further, both the person 116 and the person 118 are facing toward the camera.

The environment 100 further includes an object 122 and a person 124. An image capture device uses a frame 120 to capture images of the object 122 and the person 124. The object 122 is raised above the ground (e.g., on a bench or platform). The object 122 is occluded from view in the 120, because it is partially blocked by the person 124. The person 124 is facing in profile toward the image capture device. The environment 100 further includes an object 132. An image capture device uses a frame 130 to capture images of the object 132. The object 132 is resting on the ground.

In an embodiment, an object detection service (e.g., as discussed below in relation to FIG. 2) can attempt to identify, based on the captured image(s) from frame(s) 110, 120, and 130, whether any of the objects 112, 114, 122, and 132 are unattended. For example, the object detection service can use image recognition techniques, discussed further below, to analyze the captured images and identify which (if any) of the objects 112, 114, 122, and 132 are unattended. This can be particularly challenging because the objects 114 and 122 are occluded, and because the people 116, 118, and 124 may be moving. Further, in an embodiment, an image capture device can capture an image of the environment 100. This can be used in place of, or in addition to, images captured of the frames 110, 120, and 130.

Figure 2:
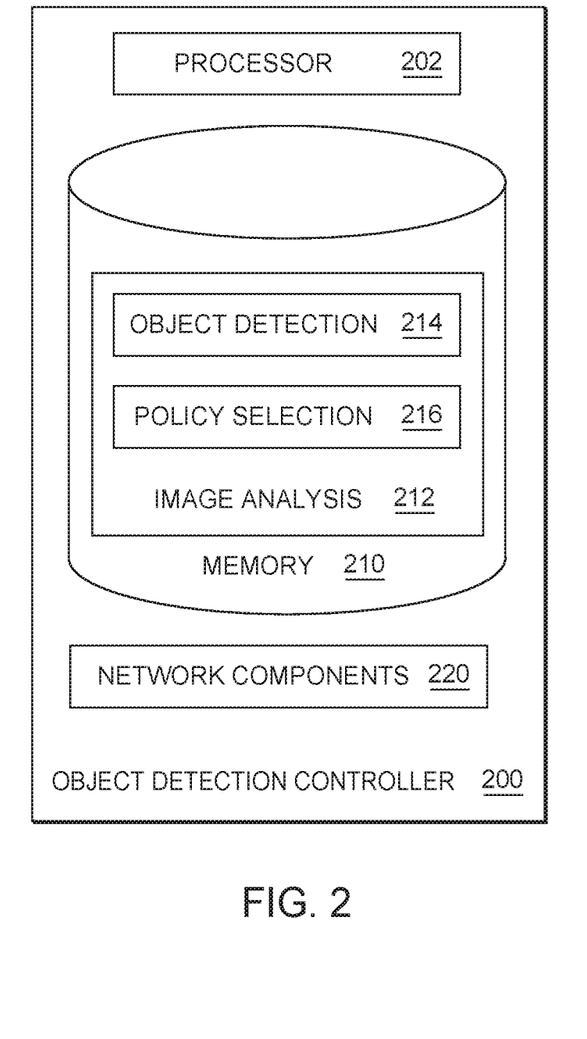
FIG. 2 is a block diagram illustrating an object detection controller for unattended object detection in crowded environments, according to at least one embodiment.

FIG. 2 is a block diagram illustrating an object detection controller 200 for unattended object detection in crowded environments, according to at least one embodiment. The object detection controller 200 includes a processor 202, a memory 210, and network components 220. The processor 202 generally retrieves and executes programming instructions stored in the memory 210. The processor 202 is included to be representative of a single central processing unit (CPU), multiple CPUs, a single CPU having multiple processing cores, graphics processing units (GPUs) having multiple execution paths, and the like.

The network components 220 include the components necessary for the object detection controller 200 to interface with components over a network. For example, the object detection controller 200 can interface with other electronic elements (e.g., image capture devices, data storage devices, etc.) using the network components. The object detection controller 200 can interface with these elements over a local area network (LAN), for example an enterprise network, a wide area network (WAN), the Internet, or any other suitable network. The network components 220 can include wired, WiFi or cellular network interface components and associated software to facilitate communication between the object detection controller 200 and a communication network.

Although the memory 210 is shown as a single entity, the memory 210 may include one or more memory devices having blocks of memory associated with physical addresses, such as random access memory (RAM), read only memory (ROM), flash memory, or other types of volatile and/or non-volatile memory. The memory 210 generally includes program code for performing various functions related to use of the object detection controller 200. The program code is generally described as various functional "applications" or "modules" within the memory 210, although alternate implementations may have different functions and/or combinations of functions.

Within the memory 210, an image analysis service 212 facilitates unattended object detection in crowded environments. For example, as discussed above in relation to FIG. 1, the image analysis service 212 can analyze captured images (e.g., images of the frames 110, 120, and 130 illustrated in FIG. 1) to detect unattended objects in the images.

In an embodiment, the image analysis service 212 includes an object detection service 214. The object detection service 214 can be used to detect objects in the images analyzed using the image analysis service 212. The image analysis service 212 further includes a policy selection service 216. In an embodiment, the policy selection service 216 is used to select policies for automated detection of unattended objects, based on the captured images (e.g., images of the frames 110, 120, and 130 illustrated in FIG. 1). The object detection service 214 and policy selection service 216 are discussed in more detail with regard to subsequent figures.

Figure 3:
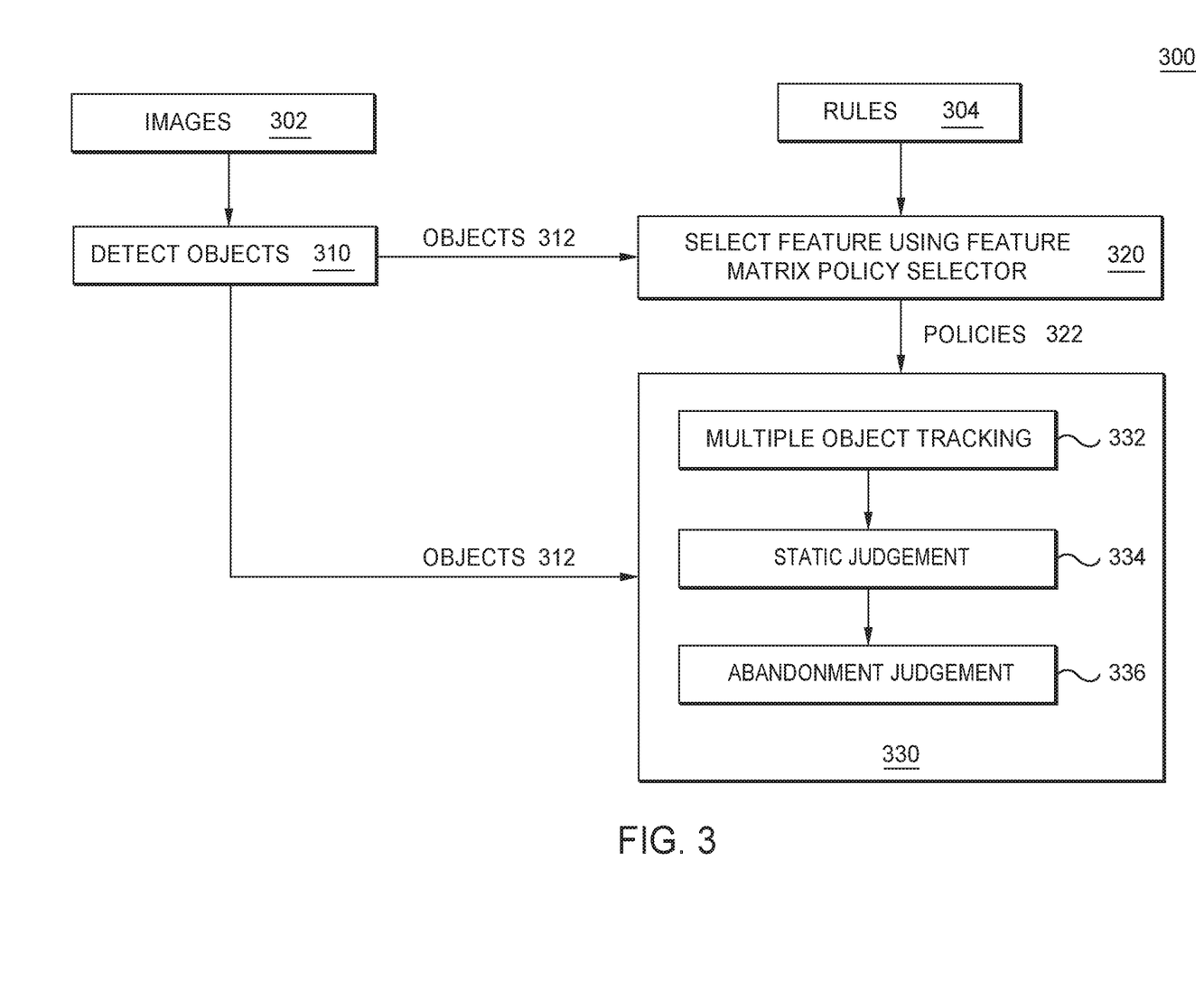
FIG. 3 is a flowchart for unattended object detection in crowded environments, according to at least one embodiment.

FIG. 3 is a flowchart 300 for unattended object detection in crowded environments, according to at least one embodiment. One or more images 302 are provided to block 310. In an embodiment, the images 302 are captured images of a physical environment (e.g., images of the frames 110, 120, and 130 illustrated in FIG. 1). The images 302 can be captured using any suitable image capture device (e.g., a still camera, a video camera, etc.). Further, the images 302 can be a series of still images, frames from a video, a video, or any other suitable captured images.

At block 310, an object detection service (e.g., the object detection service 214 illustrated in FIG. 2) analyzes the images 302 and identifies one or more objects 312. Computer vision techniques to recognize objects are well known in the art. For example, machine learning techniques can be used (e.g., Viola-Jones Object detection, scale-invariant feature transform (SIFT), histogram of oriented gradients (HOG), etc.). As another example, deep learning techniques can be used (e.g., R-CNN, SSD, YOLO, RefineDET, etc.). In an embodiment, the object detection service can use any suitable object recognition technique. The detected objects 312 are provided to both block 320 and block 330.

At block 320, a policy selection service (e.g., the policy selection service 216 illustrated in FIG. 2) uses one or more rules 304 and the objects 312 to select a feature using a feature matrix policy selector. This is discussed in more detail with regard to FIG. 4, below. The policy selection service generates one or more machine learning policies 322 and provides them to the unattended object detection techniques illustrated in block 330.

Figure 5:
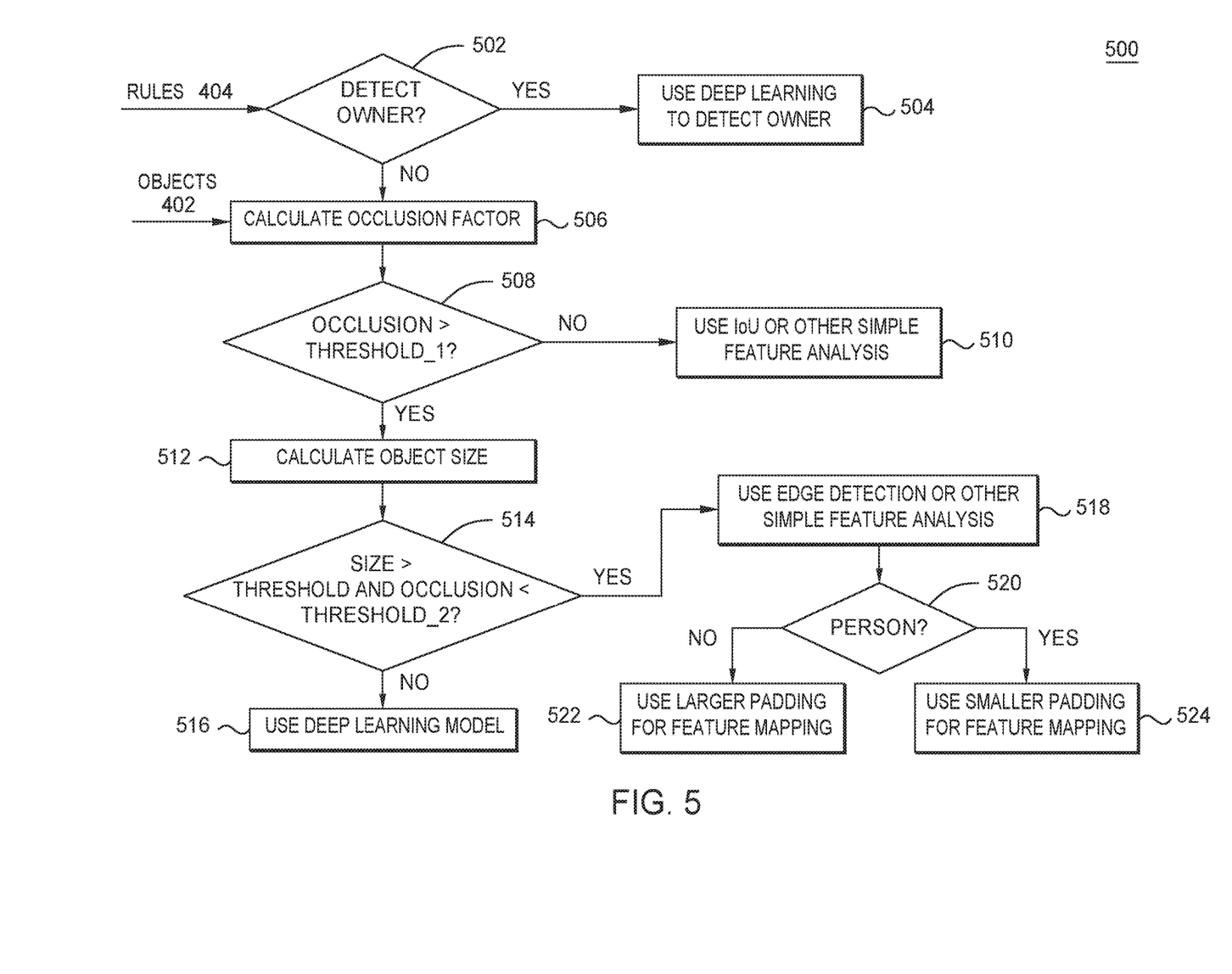
FIG. 5 is an example flowchart for unattended object detection in crowded environments, according to at least one embodiment.

Block 330 illustrates example unattended object detection techniques. In an embodiment, one or more machine learning policies 322 are selected at block 320 and used at block 330. For example, the machine learning policies 322 can govern whether a deep learning model or a simple feature analysis model should be used. Further, the machine learning policies 322 can govern whether, or how, to perform multiple object tracking at block 332, static judgment at block 334, and abandonment judgment at block 336. These are merely examples of techniques to identify unattended objects, and other suitable techniques can be used with the machine learning policies 322. FIG. 5 illustrates an example flow for unattended object detection.

For example, the machine learning policies 322 can be used to configure an image analysis service (e.g., the image analysis service 212 illustrated in FIG. 2) for multiple object tracking, at block 332. The machine learning policies 322 can enable multiple object tracking (e.g., specifying whether the image analysis service 212 should track both a potentially unattended object and a person near the object), disable multiple object tracking, or set parameters for multiple object tracking (e.g., the number of objects to track, the duration to track, the area to track, etc.).

Further, the machine learning policies 322 can be used to select a feature model to use for machine learning techniques for multiple object tracking. As discussed further below, with regard to FIG. 5, the policies 322 can specify that a deep learning model should be used for multiple object tracking, can specify which deep learning techniques to use, etc. Alternatively, the machine learning policies 322 can specify that simple features should be used, or other non-deep-learning techniques. Further, in an embodiment, multiple object tracking at block 332 can generate tracklets or trajectories for use in multiple object tracking.

As another example, the machine learning policies 322 can configure the image analysis service for static judgment, at block 334. In an embodiment, the machine learning policies 322 can be used to select a feature service to use for machine learning techniques for static judgment (e.g., judging whether a given object is moving or remaining static). For example, the machine learning policies 322 can be used to select deep learning techniques, simple feature techniques, etc. In an embodiment, static judgment at block 334 can generate static information for the tracklets or trajectories generated at block 332.

As another example, the machine learning policies 322 can configure the image analysis service for abandonment judgment, at block 336. In an embodiment, the machine learning policies 322 can be used to select a feature model to use for machine learning techniques for abandonment judgment (e.g., judging whether a given object has been abandoned and is unattended). For example, the machine learning policies 322 can be used to select deep learning techniques, simple feature techniques, etc. In an embodiment, static judgment at block 334 can use the tracklets or trajectories, with static information, generated at block 336. Further, in an embodiment, the image analysis service can provide an indication if an unattended object is discovered (e.g., an alarm, or a notification to a user).

Figure 4:
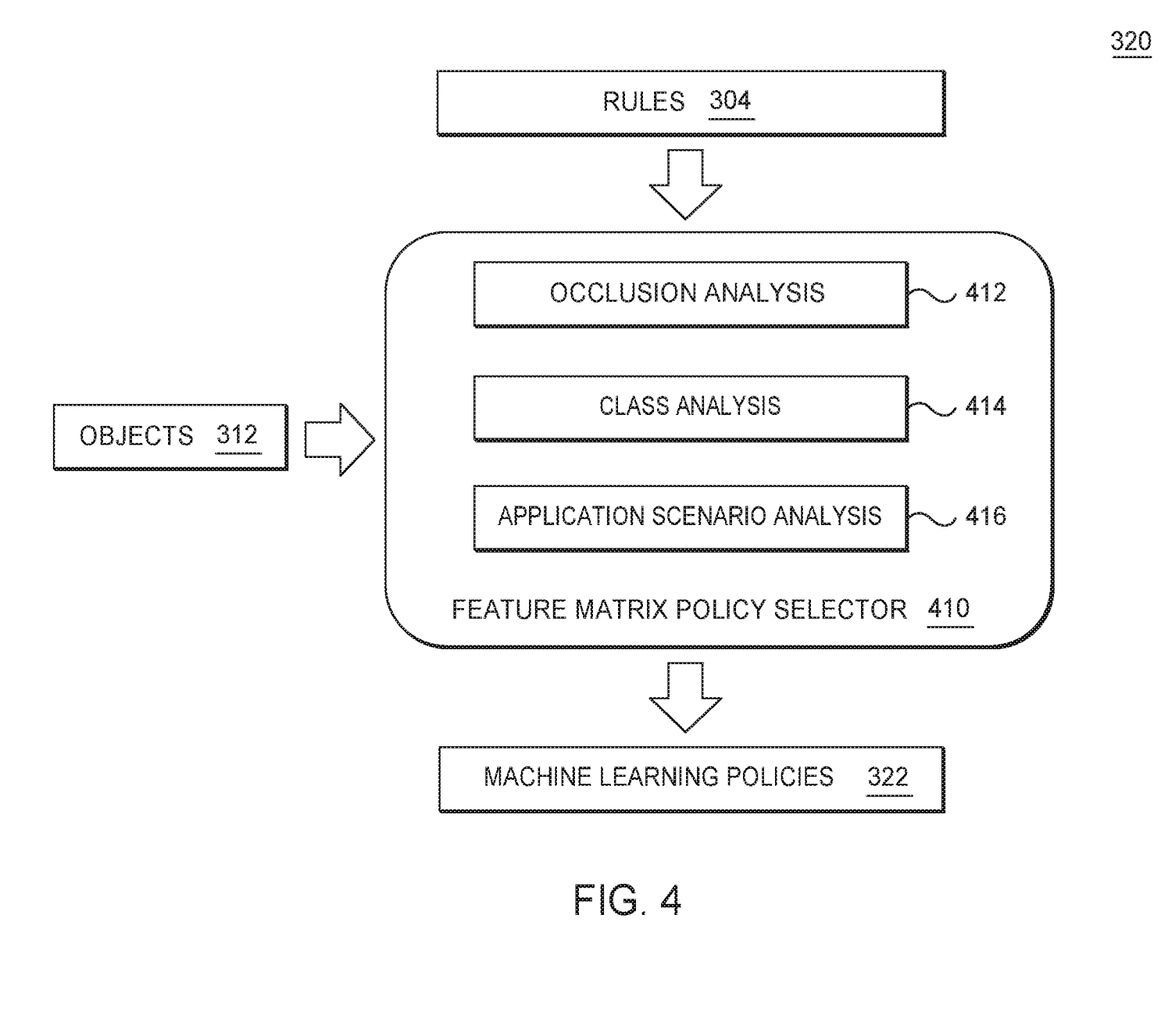
FIG. 4 is a flowchart for feature matrix policy selection for unattended object detection in crowded environments, according to at least one embodiment.

FIG. 4 is a flowchart for feature matrix policy selection for unattended object detection in crowded environments, according to at least one embodiment. In an embodiment, FIG. 4 corresponds with block 320 illustrated in FIG. 3, above. In an embodiment, objects 312 (e.g., objects identified in an image or video) and rules 304 (e.g., pre-generated rules for unattended object detection) are provided to a feature matrix policy selector 410.

The feature matrix policy selector 410 includes three blocks. At block 412, a policy selection service (e.g., the policy selection service 216 illustrated in FIG. 2) performs occlusion analysis. In an embodiment, occlusion analysis determines a level of occlusion for the various objects 312 (e.g., how much each of the objects is occluded by another object or item in the physical environment). The policy selection service can perform occlusion analysis for all of the objects 312, or a subset of the objects 312. As discussed below with regard to block 416, the level of occlusion of the objects 312 can be used to generate or select policies for unattended object detection analysis.

At block 414, the policy selection service performs class analysis. In an embodiment, the policy selection service determines which of the objects 312 correspond with people, and which correspond with objects other than people. Alternatively, or in addition, the policy selection service differentiates between objects which corresponding with items of interest (e.g., potentially unattended items like luggage, backpacks, shopping bags, etc.), and which correspond with items not of interest (e.g., architectural objects like columns and doors, furniture, natural objects like trees and rocks, advertisements, etc.). As discussed below with regard to block 416, this class analysis can be used to generate or select policies for unattended object detection analysis.

At block 416, the policy selection service performs application scenario analysis. In an embodiment, the policy selection service uses the rules 304 to generate or select policies, using the results of the occlusion analysis at block 412 and the class analysis at block 414. For example, one or more of the rules 304 could specify that a high level of occlusion results in machine learning policies 322 favoring deep learning techniques, which are more robust but more computationally expensive. One or more of the rules 304 could further specify that a low level of occlusion results in machine learning policies 322 favoring simple feature analysis, which is less robust but less computationally expensive. Similarly, one or more of the rules could use the class analysis to generate, select, or refine the machine learning policies 322. For example, as discussed below with regard to FIG. 5, the machine learning policies 322 could specify using large padding for feature mapping relating to non-person objects and small padding for feature mapping relating to person objects.

FIG. 5 is an example flowchart 500 for unattended object detection in crowded environments, according to at least one embodiment. A policy selection service (e.g. the policy selection service 216 illustrated in FIG. 2) receives one or more rules 404. In an embodiment, the rules 404 are pre-generated and are used by the policy selection service to generate machine learning policies for unattended object detection (e.g., as discussed above in relation to block 416 in FIG. 4). In an embodiment, the rules 404 can be generated by a user (e.g., a system administrator) using a suitable user interface. Alternatively, or in addition, the rules 404 can be generated directly by a user, can be generated by another system, can be retrieved from a network location or network service, etc.

At block 502, the policy selection service determines whether the owner of any potentially unattended objects should be detected. For example, the rules 404 can specify that any person who deposits an object in the physical environment (e.g., drops a bag or piece of luggage) and then leaves the object (e.g., walks away) should be detected. Further, the movements of the owner can be followed for a short time. In an embodiment, this can be used to identify objects which are unattended.

If the owner is to be detected, the flow proceeds to block 504. At block 504, the policy selection service determines that a deep learning model should be used to detect the owner of the object. The policy selection service generates a policy specifying that a deep learning model should be used. For example, the policy selection service can generate a policy specifying that a convolutional neural network (CNN) should be used. In an embodiment, the CNN can be trained to detect the owner of objects in the captured image or video. This is merely one example, and other suitable deep learning techniques can be used. The rules 404 can specify a CNN to be used, can specify parameters to use with the CNN, etc.

Returning to block 502, the flow proceeds to block 506. At block 506, the policy selection service receives one or more objects 402. In an embodiment, the objects 402 are detected from a captured image, or video. For example, as described above in relation to FIG. 3, an object detection service (e.g., the object detection service 214 illustrated in FIG. 2) can analyze captured images using known object detection techniques and can identify objects in the captured images. In an embodiment, the object detection service can use known machine learning techniques. Alternatively, or in addition, the object detection service can use other known techniques to identify objects in the captured images.

At block 506, the policy selection service calculates an occlusion factor for the objects 402. In an embodiment, the occlusion factor is a numeric representation of the occlusion of the objects 402 in the captured image. For example, the occlusion factor could be a number between 0 and 1, with a value closer to 1 specifying more occlusion and a number closer to 0 specifying less occlusion. This is merely one example, and any suitable occlusion factor can be used. Further, the policy selection service can determine the occlusion factor based on all of the objects 402, or based on only some (e.g., a subset) of the objects 402. In an embodiment, this can be specified in one of the rules 404, as a hyper-parameter from a user (e.g., configured by a system administrator), or in any other suitable way.

At block 508, the policy selection service compares the calculated occlusion factor with a first threshold. In an embodiment, the threshold can be provided in the rules 404. Alternatively, the threshold can be provided as a hyper-parameter from a user (e.g., configured by a system administrator).

If the occlusion factor is not greater than the threshold, the flow proceeds to block 510. For example, a lower occlusion factor indicates that the physical environment in the captured image is relatively uncrowded. Therefore, deep learning techniques (which may be computationally expensive) are likely not necessary and simple techniques can be used. In an embodiment, if the occlusion factor is equal to the threshold, the flow can also proceed to block 510. Alternatively, if the occlusion factor is equal to the threshold, the flow can proceed to block 512.

At block 510, the policy selection service determines that simple feature analysis machine learning techniques should be used. The policy selection service generates a policy specifying that simple feature analysis techniques should be used. For example, the policy selection service could generate a policy specifying that a machine learning model using intersection over union (IoU) techniques should be used.

In an embodiment, the policy selection service can differentiate between techniques to use to analyze person and non-person objects. At block 510, the policy selection service can generate a policy specifying that simple feature analysis techniques (e.g., IoU) should be used for both person and non-person objects. In an embodiment, the same simple feature analysis techniques can be applied to both person and non-person objects. Alternatively, different simple feature analysis techniques can be applied to person and non-person objects. This is merely one example, and other suitable simple feature analysis techniques can be used. In an embodiment, the simple feature analysis techniques to be used can be specified in the rules 404.

Returning to block 508, if the occlusion factor is greater than the threshold, the flow proceeds to block 512. In an embodiment, this indicates that the physical environment in the captured image is relatively crowded, and so more complex techniques may be necessary.

At block 512, the policy selection service calculates the size of one or more of the objects 402. In an embodiment, the policy selection service can calculate the size of all of the objects 402. Alternatively, the policy selection service can calculate the size of some (e.g., a subset) of the objects 402.

At block 514 the policy selection service compares the object size with a size threshold and compares the occlusion factor with a second occlusion threshold. In one embodiment, the second occlusion threshold is greater than the first occlusion threshold. If the object size is greater than the size threshold, and the occlusion factor is less than the second occlusion threshold, the flow proceeds to block 518. In an embodiment, larger objects are relatively easier to detect and analyze. Therefore, if the objects are of sufficient size, and the physical environment is not overly crowded, simple feature analysis techniques can be used instead of deep learning techniques.

In an embodiment, the object size and occlusion factor can be balanced to determine whether deep learning techniques are necessary. For example, the amount of processing power to be used and desired speed can be balanced against the desired accuracy of the results. Using deep learning techniques is likely to be more accurate, but slower and requiring more processing power. The size threshold and second occlusion threshold can be set to balance these competing concerns (e.g., based on empirical testing and results). In an embodiment, the size threshold and second occlusion threshold can be provided in the rules 404, provided as hyper-parameters specified by a user (e.g., a system administrator) or provided from any other suitable source.

At block 518, the policy selection service determines that simple feature analysis machine learning techniques should be used. The policy selection service generates a policy specifying that simple feature analysis techniques should be used. For example, the policy selection service could generate a policy specifying that a machine learning model using edge detection techniques should be used.

In an embodiment, the policy selection service can differentiate between techniques to use to analyze person and non-person objects. At block 518, the policy selection service can generate a policy specifying that simple feature analysis techniques (e.g., edge detection) should be used for both person and non-person objects. In an embodiment, the same simple feature analysis techniques can be applied to both person and non-person objects. Alternatively, different simple feature analysis techniques can be applied to person and non-person objects. This is merely one example, and other suitable simple feature analysis techniques can be used. In an embodiment, the simple feature analysis techniques to be used can be specified in the rules 404.

The policy selection service can further differentiate between parameters with person and non-person objects. For example, assume the policy selection service generates a policy specifying that edge detection techniques should be used with both person and non-person objects. The policy selection service can set different padding levels for feature mapping to be used with these edge detection techniques for person and non-person objects.

At block 520, the policy selection service determines whether a given object is a person or a non-person object. If the object is a person object, the flow proceeds to block 524. At block 524, the policy selection service specifies that smaller padding should be used for feature mapping for the person object. In an embodiment, padding refers to the size of the shape used to mark the object (e.g., a rectangle) for image analysis. A person object is a relatively richer target, and easier to distinguish from the background in an image. This allows for smaller padding around the person object in the shape used to mark the object (e.g., less padding around the object within the shape marking). If the object is not a person object, the flow instead proceeds to block 522 and larger padding is used for feature mapping. Non-person objects are generally harder to distinguish and therefore require more padding.

Returning to block 514, if the object size is less than the size threshold or the occlusion factor is greater than the second occlusion threshold (or both), the flow proceeds to block 516. In an embodiment, if the object size or the occlusion factor are equal to their respective thresholds, the flow can also proceed to block 516. Alternatively, if the object size or the occlusion factor are equal to their respective thresholds, the flow can proceed to block 518. Further, while block 514 illustrates using both a size threshold and a second occlusion threshold, in an embodiment only the size threshold is used (e.g., the object size is compared with the size threshold and if the size is greater than the threshold the flow proceeds to block 518).

At block 516, the policy selection service generates a policy specifying that a deep learning model should be used. For example, the policy selection service can generate a policy specifying that a CNN should be used. In an embodiment, this CNN can be trained to identify unattended objects in a captured image or video. This is merely one example, and other suitable deep learning techniques can be used. The rules 404 can specify the CNN to be used, can specify parameters to use with the CNN, etc.

Figure 6:
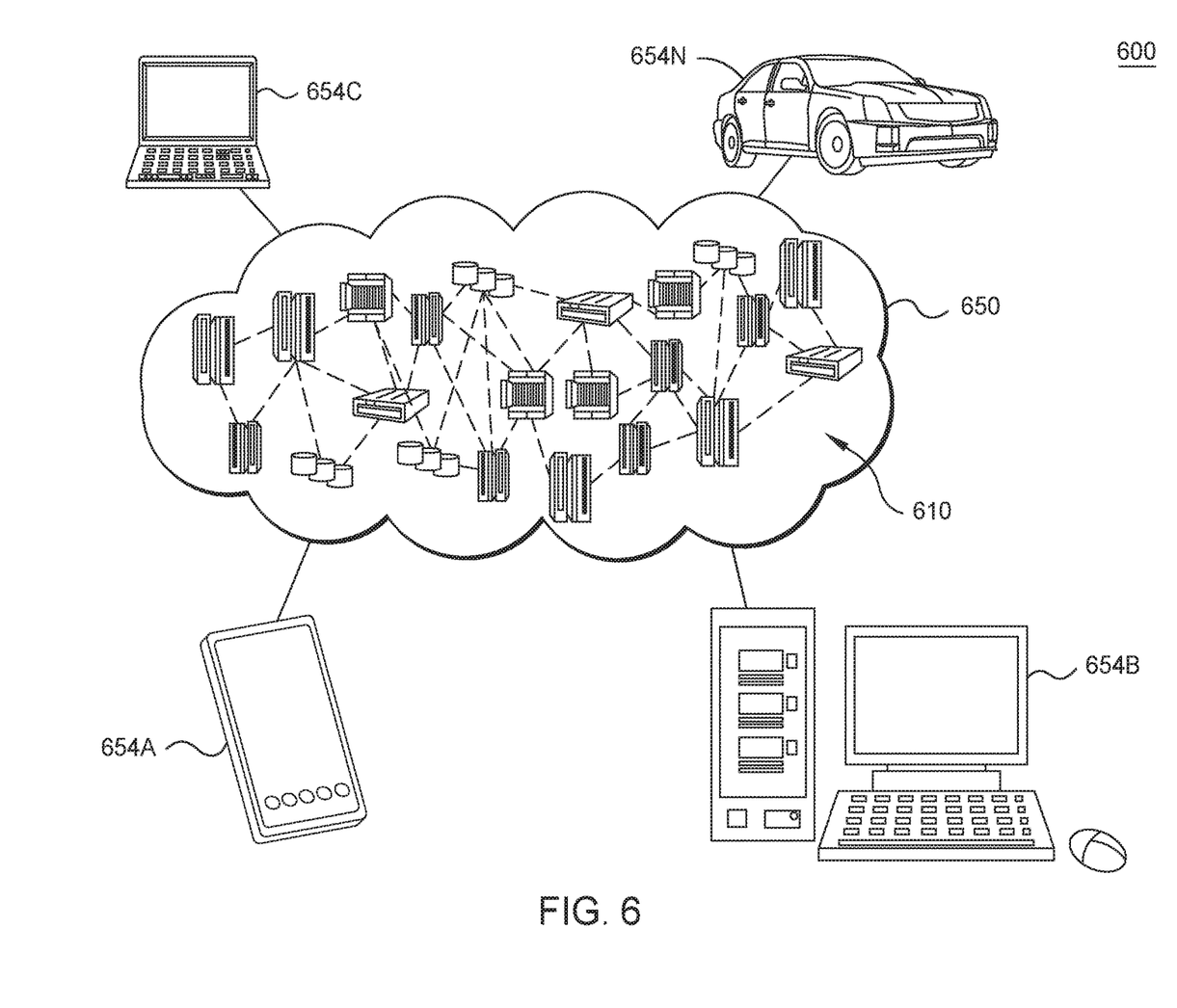
FIG. 6 depicts a cloud computing environment, according to at least one embodiment.

FIG. 6 depicts a cloud computing environment 600, according to at least one embodiment. It is to be understood that although this disclosure includes a detailed description on cloud computing, implementation of the teachings recited herein are not limited to a cloud computing environment. Rather, embodiments are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 6, illustrative cloud computing environment 650 is depicted. As shown, cloud computing environment 650 includes one or more cloud computing nodes 610 with which local computing devices used by cloud consumers, such as, for example, personal digital assistant (PDA) or cellular telephone 654A, desktop computer 654B, laptop computer 654C, and/or automobile computer system 654N may communicate. Nodes 610 may communicate with one another. They may be grouped (not shown) physically or virtually, in one or more networks, such as Private, Community, Public, or Hybrid clouds as described hereinabove, or a combination thereof. This allows cloud computing environment 650 to offer infrastructure, platforms and/or software as services for which a cloud consumer does not need to maintain resources on a local computing device. It is understood that the types of computing devices 654A-N shown in FIG. 6 are intended to be illustrative only and that computing nodes 610 and cloud computing environment 650 can communicate with any type of computerized device over any type of network and/or network addressable connection (e.g., using a web browser).

Figure 7:
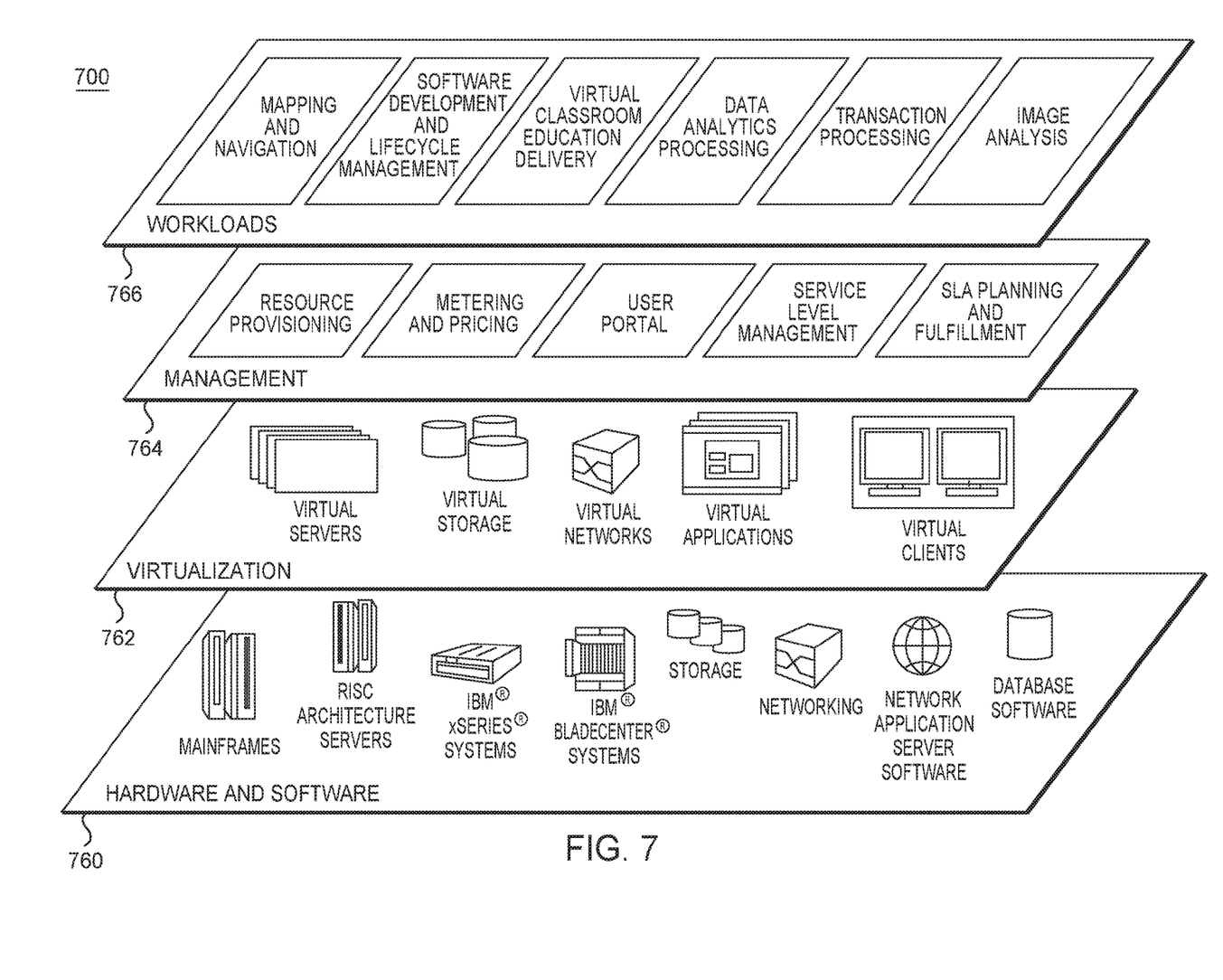
FIG. 7 depicts abstraction model layers, according to at least one embodiment.

Referring now to FIG. 7, a set of functional abstraction layers 700 provided by cloud computing environment 650 (FIG. 6) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 760 includes hardware and software components. Examples of hardware components include: mainframes; RISC (Reduced Instruction Set Computer) architecture based servers; servers; blade servers; storage devices; and networks and networking components. In some embodiments, software components include network application server software and database software.

Virtualization layer 762 provides an abstraction layer from which the following examples of virtual entities may be provided: virtual servers; virtual storage; virtual networks, including virtual private networks; virtual applications and operating systems; and virtual clients.

In one example, management layer 764 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 766 provides examples of functionality for which the cloud computing environment may be utilized. Examples of workloads and functions which may be provided from this layer include: mapping and navigation; software development and lifecycle management; virtual classroom education delivery; data analytics processing; transaction processing; and a cloud privacy service. In an embodiment, some or all of the modules of the object detection controller 200 could be implemented in the workloads layer 766. For example, the image analysis service 212, including the object detection service 214 and the policy selection service 216, could be implemented in the workloads layer 766. In an embodiment, the image analysis service 212 could execute on a computing system in the cloud (e.g., in the workloads layer 766) and associate data (e.g., images, rules, etc.) could be stored in the cloud. Doing so allows access to this information from any computing system attached to a network connected to the cloud (e.g., the Internet).

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the preceding, reference is made to embodiments presented in this disclosure. However, the scope of the present disclosure is not limited to specific described embodiments. Instead, any combination of the preceding features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the preceding aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present invention may take the form of an entirely hardware embodiment, an entirely software embodiment (including firmware, resident software, microcode, etc.) or an embodiment combining software and hardware aspects that may all generally be referred to herein as a "circuit," "module" or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to embodiments of the present invention, other and further embodiments of the invention may be devised without departing from the basic scope thereof, and the scope thereof is determined by the claims that follow.

What is claimed is:

1. A computer-implemented method comprising:
   generating a machine learning policy for use in identifying unattended objects in a captured image depicting one or more objects, comprising:
      determining a level of occlusion in the captured image relating to the objects; and
      determining the machine learning policy based on the determined level of occlusion, comprising:
         determining that the level of occlusion in the captured image exceeds a first occlusion threshold, and in response selecting the machine learning policy;
   selecting a deep learning machine learning model, from among a plurality of pre-defined machine learning models, based on the generated machine learning policy, wherein the plurality of pre-defined machine learning models comprises the deep learning model and a feature analysis model; and
   identifying an unattended object in the captured image using the selected machine learning model.

2. The method of claim 1, further comprising:
   determining a second level of occlusion in a second captured image relating to a second one or more objects depicted in the second captured image;
   determining a second machine learning policy based on the second level of occlusion, comprising:
      determining that the second level of occlusion in the second captured image does not exceed the first occlusion threshold, and in response selecting a feature analysis model for the determined second machine learning policy; and
   selecting the feature analysis model, from among the plurality of pre-defined machine learning models, based on the determined second machine learning policy.

3. The method of claim 2, wherein the feature analysis model uses intersection over union (IoU).

4. The method of claim 1, wherein generating the machine learning policy further comprises:
   calculating an object size relating to the one or more objects; and
   determining that the object size exceeds an object size threshold,
      wherein the selecting the deep learning model is further based on the determining that the object size exceeds the object size threshold.

5. The method of claim 4, wherein generating the machine learning policy further comprises:
   determining that the level of occlusion exceeds a second occlusion threshold greater than the first occlusion threshold, wherein the selecting the deep learning model is further based on the determining that the level of occlusion exceeds the second occlusion threshold in addition to exceeding the first occlusion threshold.

6. The method of claim 1, the method further comprising:
determining a second level of occlusion in a second captured image relating to a second one or more objects depicted in the second captured image;
determining a second machine learning policy based on the second level of occlusion, comprising:
determining that the second level of occlusion in the captured image exceeds the first occlusion threshold;
calculating an object size relating to the second one or more objects; and
determining that the object size exceeds an object size threshold, and in response selecting the feature analysis model for the determined machine learning policy.

7. The method of claim 6, wherein the feature analysis model comprises edge detection.

8. The method of claim 6, wherein generating the machine learning policy further comprises:
determining that the level of occlusion does not exceed a second occlusion threshold greater than the first occlusion threshold, wherein the selecting the feature analysis model is further based on the determining that the level of occlusion does not exceed the second occlusion threshold.

9. The method of claim 1, wherein generating the machine learning policy further comprises:
determining that at least one of the objects is a person, wherein the determining the machine learning policy is further based on the determining that at least one of the objects is a person.

10. The computer-implemented method of claim 1, wherein the feature analysis model does not use deep learning.

11. A system, comprising:
a processor; and
a memory storing a program, which, when executed on the processor, performs an operation, the operation comprising:
generating a machine learning policy for use in identifying unattended objects in a captured image depicting one or more objects, comprising:
determining a level of occlusion in the captured image relating to the objects; and
determining the machine learning policy based on the determined level of occlusion, comprising:
determining that the level of occlusion in the captured image exceeds a first occlusion threshold, and in response selecting the machine learning policy;
selecting a deep learning machine learning model, from among a plurality of pre-defined machine learning models, based on the generated machine learning policy, wherein the plurality of pre-defined machine learning models comprises the deep learning model and a feature analysis model; and
identifying an unattended object in the captured image using the selected machine learning model.

12. The system of claim 11, the operation further comprising:
determining a second level of occlusion in a second captured image relating to a second one or more objects depicted in the second captured image;
determining a second machine learning policy based on the second level of occlusion, comprising:
determining that the second level of occlusion in the second captured image does not exceed the first occlusion threshold, and in response selecting a feature analysis model for the determined second machine learning policy; and
selecting the feature analysis model, from among the plurality of pre-defined machine learning models, based on the determined second machine learning policy.

13. The system of claim 11, the operation further comprising:
determining a second level of occlusion in a second captured image relating to a second one or more objects depicted in the second captured image;
determining a second machine learning policy based on the second level of occlusion, comprising:
determining that the second level of occlusion in the captured image exceeds the first occlusion threshold;
calculating an object size relating to the second one or more objects; and
determining that the object size exceeds an object size threshold, and in response selecting the feature analysis model for the determined machine learning policy.

14. The system of claim 11, wherein generating the machine learning policy further comprises:
determining that at least one of the objects is a person, wherein the determining the machine learning policy is further based on the determining that at least one of the objects is a person.

15. A non-transitory computer program product, the computer program product comprising:
a computer-readable storage medium having computer-readable program code embodied therewith, the computer-readable program code executable by one or more computer processors to perform an operation, the operation comprising:
generating a machine learning policy for use in identifying unattended objects in a captured image depicting one or more objects, comprising:
determining a level of occlusion in the captured image relating to the objects; and
determining the machine learning policy based on the determined level of occlusion, comprising:
determining that the level of occlusion in the captured image exceeds a first occlusion threshold, and in response selecting the machine learning policy;
selecting a deep learning machine learning model, from among a plurality of pre-defined machine learning models, based on the generated machine learning policy, wherein the plurality of pre-defined machine learning models comprises the deep learning model and a feature analysis model; and
identifying an unattended object in the captured image using the selected machine learning model.

16. The computer program product of claim 15, the operation further comprising:
determining a second level of occlusion in a second captured image relating to a second one or more objects depicted in the second captured image;
determining a second machine learning policy based on the second level of occlusion, comprising:

determining that the second level of occlusion in the second captured image does not exceed the first occlusion threshold, and in response selecting a feature analysis model for the determined second machine learning policy; and selecting the feature analysis model, from among the plurality of pre-defined machine learning models, based on the determined second machine learning policy.

17. The computer program product of claim 15, wherein generating the machine learning policy further comprises:

calculating an object size relating to the one or more objects;

determining that the object size exceeds an object size threshold; and determining that the level of occlusion exceeds a second occlusion threshold greater than the first occlusion threshold, wherein the selecting the deep learning model is further based on the determining that the object size exceeds the object size threshold and the determining that the level of occlusion exceeds the second occlusion threshold in addition to exceeding the first occlusion threshold.

18. The computer program product of claim 15, wherein generating the machine learning policy further comprises:

determining that at least one of the objects is a person, wherein the determining the machine learning policy is further based on the determining that at least one of the objects is a person.

\* \* \* \* \*